United States Patent

Forest

[15] 3,657,091
[45] Apr. 18, 1972

[54] ELECTROPHORETIC IMAGING METHOD EMPLOYING A PERIODIC ELECTRIC FIELD

[72] Inventor: Edward Forest, Penfield, N.Y.
[73] Assignee: Xerox Corporation, Rochester, N.Y.
[22] Filed: Oct. 3, 1968
[21] Appl. No.: 764,715

[52] U.S. Cl. ..................................204/181, 96/1, 96/1.3
[51] Int. Cl. ..................................C23b 13/00, G03g 13/00
[58] Field of Search..................................96/1, 1.5; 204/181

[56] References Cited

UNITED STATES PATENTS

| | | | |
|---|---|---|---|
| 3,384,565 | 5/1968 | Tulagin et al. | 96/1 X |
| 3,384,566 | 5/1968 | Clark | 204/181 |
| 3,448,025 | 6/1969 | Krieger et al. | 204/181 |

*Primary Examiner*—George F. Lesmes
*Assistant Examiner*—M. B. Wittenberg
*Attorney*—James J. Ralabate, David C. Petre and Barry Jay Kesselman

[57] ABSTRACT

Method and apparatus for improving image density, contrast and quality and photographic speed in an electrophoretic imaging system utilizing a particulate suspension for forming the image. The method and apparatus stress a thin layer of the electrophoretic suspension of particles in a carrier on an electrode during imaging by applying a high frequency pulsed or varying electric field across the imaging suspension.

15 Claims, 10 Drawing Figures

INVENTOR.
EDWARD FOREST
BY Barry Jay Kesselman
ATTORNEY

ELECTROPHORETIC IMAGING METHOD EMPLOYING A PERIODIC ELECTRIC FIELD

This invention relates in general to electrophoretic imaging and more specifically to method and apparatus for improving quality of the images produced.

A new imaging system in which one or more types of photosensitive radiant energy absorbing particles believed to bear a charge when suspended in a non-conductive liquid carrier and placed in an electroded system and exposed to an image radiation configuration has recently been described. See U.S. Pat. No. 3,384,565 issued May 21, 1968 in the names of V. Tulagin and L. M. Carreira. The particles of this system migrate in image configuration providing a visual image at one or both of the two electrodes between which they are placed. The system employs particles which are photosensitive and which apparently undergo a net change in charge polarity upon exposure to activating radiation by interaction with one of the electrodes. No other photosensitive elements or materials are required, therefore providing a very simple and inexpensive imaging technique. Mixtures of two or more differently colored particles are used to secure various colors of images and imaging mixes having different spectral responses. Particles in these mixes may have either separate or overlapping spectral response curves and may even be used in subtractive color synthesis. In a monochromatic system the particles will migrate if energy of any wavelength within the panchromatic spectrum of the particle response strikes the particle.

It may be that other systems exist or will be discovered or invented that require in their operation suspensions that have some or enough of the properties of the suspensions described herein that this invention can be used thereon to improve such a system and such use is contemplated hereby.

Therefore, it is an object of this invention to provide a method and apparatus for improving photoelectrophoretic imaging systems.

Another object of this invention is to improve the photographic speed of suspensions in inking systems. Still another object of this invention is to improve image quality in certain imaging systems.

A further object of this invention is to improve color saturation in particular color imaging systems.

These and other objects, features and advantages of the present invention are achieved by presenting discontinuous electrical field across the imaging suspension while it is under imaging conditions.

These and other objects and advantages of this invention will become apparent to those skilled in the art after reading the following description taken in conjunction with the accompanying drawings wherein.

Figure 1:
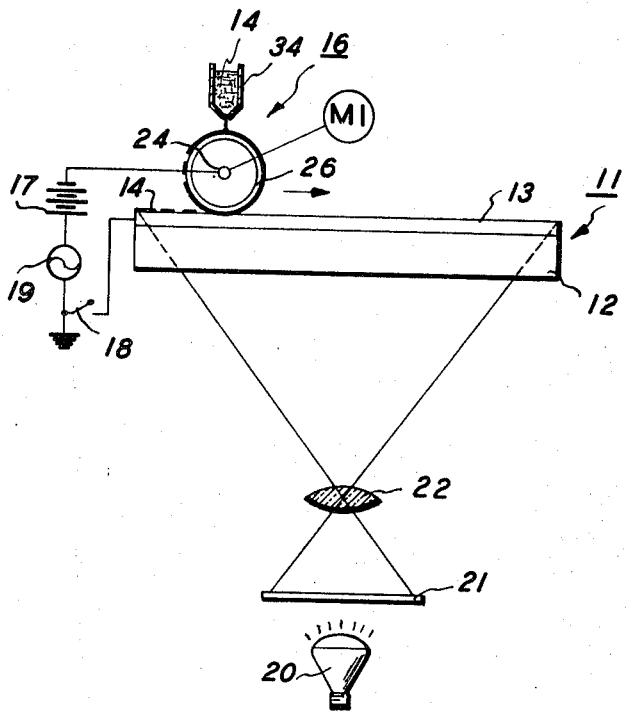
FIG. 1 is a schematic representation of an imaging system including one means of providing an alternating electrical field to the imaging suspension for better image rendition.
Figure 6:
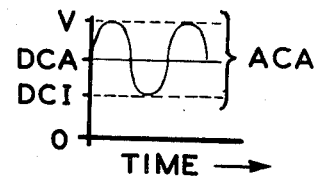
Figure 3:
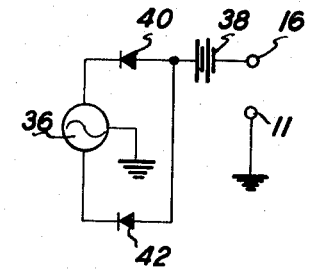
Figure 7:
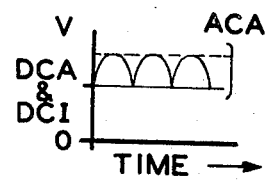
Figure 8:
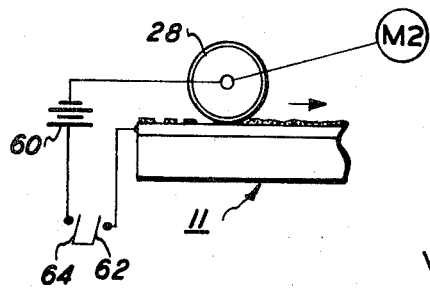
Figure 9:
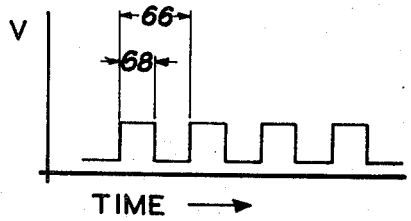
Figure 4:
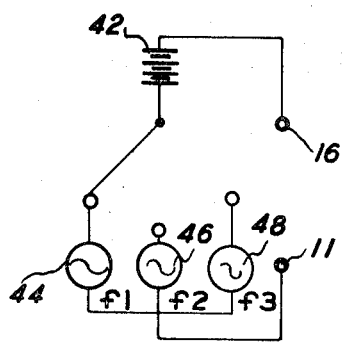
Figure 10:
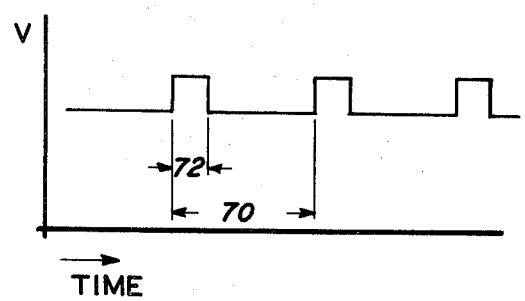
Figure 5:
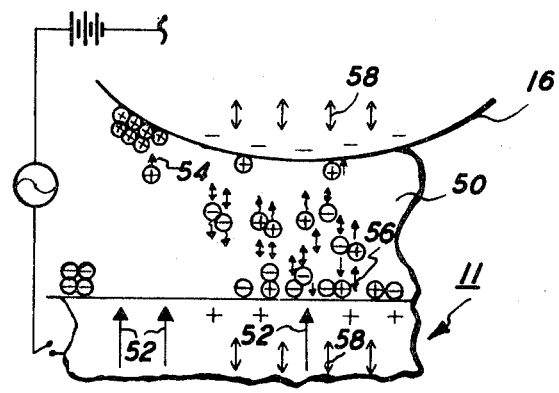

FIG. 3 diagrammatically shows a circuit to provide an alternating electrical field to an imaging system;

FIG. 4 diagrammatically shows a circuit to provide variable control over the frequency of an alternating electrical field to an imaging system;

FIG. 5 schematically illustrates the stresses in the image area affected by this invention;

FIG. 6 graphically illustrates the field pattern across the image suspension of FIG. 1;

FIG. 7 graphically illustrates the field pattern across the image suspension from the circuit of FIG. 3;

FIG. 8 schematically shows apparatus for forming a discontinuous electrical field; and, FIGS. 9 and 10 show field patterns across the image suspension of FIG. 8.

Referring now to FIG. 1 there is shown a transparent electrode generally designated 11 which, for illustration, is made up of a layer of optically transparent glass 12 overcoated with a thin optically transparent layer 13 of tin oxide commercially available under the name NESA glass from Pittsburgh Plate Glass Company. This electrode is referred to as the injecting electrode or the imaging electrode. To be coated on the surface of the injecting electrode 11 is a thin layer of finely divided photosensitive particles dispersed in an insulating carrier liquid hereinafter referred to as the suspension. The term "photosensitive" may be defined as applying to any particle which, once attracted to the injecting electrode will migrate away from it under the influence of an applied electric field when it is exposed to actinic electromagnetic radiation. The term "suspension" may be defined as a system having solid particles dispersed in a solid, liquid or gas. Nevertheless, the suspensions described for illustration are of the general type having a solid dispersed in a liquid carrier.

Above the suspension 14 is a blocking electrode 16 which is connected to one side of a constant potential source 17 through a switch 18. The opposite side of the potential source 17 is connected to the injecting electrode 11 so that when the switch 18 is closed an electric field is applied across the liquid suspension 14 between electrodes 11 and 16. An alternating potential source 19 is connected in series between potential 17 and switch 18. An image projector made up of a light source 20, a transparency 21 and a lens 22 is provided to expose the suspension 14 to a light image of the original transparency 21 to be reproduced. The optical transparency of the electrode 11 is shown by way of example and does not affect the scope of the invention herein. Neither does the particular environment shown for imaging. Of course, this system of exposure is merely illustrative and does not materially affect the invention herein.

The electrode 16 is made in the form of a roller having a conductive central core 24 connected to the potential 17. The core is covered with a layer of a blocking electrode material 26 which may be Tedlar, a polyvinyl fluoride commercially available from E. I. DuPont de Nemours and Co. Inc., or other material. In this embodiment of the imaging system, the particle suspension is exposed to the image to be reproduced while a potential is applied across the blocking and injecting electrodes by closing switch 18. The blocking electrode 16 rolls across the top surface of the injecting electrode 11 with switch 18 closed during the period of image exposure. A suitable drive or motor M-1 causes this movement. The exposure causes the exposed particles originally attracted to the electrode 11 to migrate through the liquid and adhere to the surface of the electrode 16 leaving behind a particle image on the injecting electrode surface which is a duplicate of the original transparency 21.

The electrical action provided by the addition of an alternating potential across the suspension markedly affects the contrast, background and density of the image formed on the electrode 11. Although cleaning of the electrodes and transferring or fixing of the images formed are not shown, it is contemplated that suitable means known in the art could be used to achieve the desired results.

Figure 2:
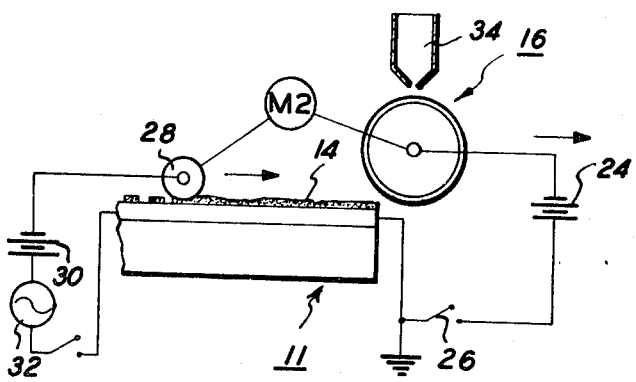
FIG. 2 shows schematically alternative apparatus.

FIG. 2 shows alternative apparatus for improving the image quality in a photoelectrophoretic imaging system of the type described in FIG. 1. Here, the blocking electrode 16 traverses the injecting electrode 11 leaving a residue of the suspension 14 in image configuration. The electrical bias between the two rollers is supplied by a potential source 24 which is activated by a switch 26 during the traversing by blocking electrode 16 of the injecting electrode 11. The electrode 16 is caused to move across the surface of the electrode 11 by any suitable means such as the motor M-2. Following the imaging by the blocking electrode over the injecting electrode, a third electrode 28 shaped as a roller traverses the surface of the imaged suspension 14. The motor M-2 or any other suitable means may be used to initiate and maintain this movement. The electrode 28 is connected to a suitable constant potential source 30 sufficient to maintain the image formed previously. A second source 32 having an alternating potential is simultaneously applied to the roller 28 with the constant potential source 30. The addition of the potential variation causes an improved image with a minimum of background and a better range of density and contrast. Both FIG. 1 and FIG. 2 show a suspension dispenser 34 which schematically represents a means to supply the suspension 14 to the interface between the electrodes forming the image with the suspension 14.

FIG. 3 represents a schematic circuit diagram showing a means to achieve a rectified alternating potential to be substituted for such sources as 17 and 19 of FIG. 1. The alternating potential source 36 is connected in series with a constant potential source 38. Between these sources are rectifying diodes 40 and 42 which prevent the negative portion of the alternating potential to pass therethrough. In fact, this circuit provides a fully rectified potential supplied by the alternating potential source 36 providing a wave form as shown in FIG. 7. The circuit causes the above mentioned electrical effects at the interface between electrodes such as 16 and 11 in FIG. 1.

FIG. 4 represents a circuit schematically illustrating means for varying the frequency of the alternating potential supplied to the electrodes 16 and 11 while maintaining a constant potential across those electrodes. A constant potential source 42 is connected in series with three alternating potential sources having various frequencies $f1$, $f2$, $f3$. By moving a switch selector arm 42, the frequency of the varying potential applied between electrodes 11 and 16 may be increased or decreased according to whether the switch arm 42 contacts alternating potential source 44, 46 or 48. The frequency increases according to the diagram shown in FIG. 4 with frequency $f3$ being the highest and $f1$ being the lowest. An alternative method of changing the frequency of the variable potential source may be to provide a variable potential input with a capability of infinite change by suitable oscillators or the like.

FIG. 5 is a representation for presenting a theoretical explanation for the improved results achieved by the method and apparatus described herein. The theories expressed herein have been experimentally shown to be operative and to create both color separation in polychromatic imaging systems and quality images in both polychromatic and monochromatic systems. There is, of course, no intention to limit the invention to the theories of operation expressed herein which are given only to clarify the results obtained with the methods and structure described.

Electrode 11 is referred to as the injecting or imaging electrode and it should be understood to mean that it is an electrode which will preferably be capable of exchanging charge with the photosensitive particles of the imaging suspension 14 when the suspension is exposed to light so that a net change in the charge polarity of the particles results. The electrode 16 is referred to as the blocking electrode meaning that it has a tendency not to inject electrons into or receive electrons from the photosensitive particles of the suspension 14. Beside Tedlar, which may be used for the blocking electrode, any other suitable material having a resistivity of about $10^7$ ohms per square centimeter or greater may be employed as the blocking electrode surface material.

A wide range of voltages may be applied between the electrodes in the system. For good image resolution, high image density and low background it is preferred that the potential applied be such as to create an electric field of at least about 300 volts per mil. across the imaging suspension. The applied potential necessary to attain this field of strength will, of course, vary depending upon the interelectrode gap and upon the thickness and type of blocking material used on the blocking electrode surface. For the very highest image quality the optimum field is at least 2,000 volts per mil. The upper limit of the field strength is limited only by the breakdown potential of the suspension and blocking electrode material. Images produced at fields below about 300 volts per mil., are generally of low and/or low irregular density. The field utilized is calculated by dividing the potential applied between the electrodes by the inter-electrode gap measurement. The field is assumed to be applied across this gap. Thus, with two electrodes spaced about 1 mil. apart, a potential of about 300 volts applied between the blocking and injecting electrode surfaces will produce a field across the imaging suspension of about 300 volts per mil. Where both the constant and varying potential are being applied simultaneously to the suspension, it is preferable to maintain this low value during the course of imaging.

The particles within the suspension are non-conductive when not being struck with activating radiation. The negative particles come into contact with or are closely adjacent to the injecting electrode 11 and remain in that position under the influence of the applied electric field until they are subjected to exposure to activating electromagnetic radiation. The particles bound on the surface of the injecting electrode 11 make up the potential imaging particles for the final image to be reproduced thereon. When activating radiation strikes the particles, it is absorbed by the photosensitive particle and makes the particle conductive "creating" hole-electron pairs of charge carriers which may be considered mobil in nature. These newly created hole-electron pairs within the particles are thought to remain separated before they can combine due to the electrical field surrounding the particle between the two electrodes. The negative charge carriers of these hole-electron pairs move toward the positive electrode 11 while the positive charge carriers move toward the electrode 16. The negative charge carriers near the particle-electrode interface at electrode 11 can move across the very short distance between the particle and the surface 13 leaving the particle with the net positive charge after sufficient charge transfer. These net positively charged particles are now repelled away from the positive surface of electrode 11 and attracted toward the negative blocking electrode 16. Accordingly, the particles struck by activating radiation of a wavelength with which they are sensitive, that is to say a wavelength which will cause the formation of hole-electron pairs within the particles, move away from the electron 11 to the electrode 16 leaving behind only particles which are not exposed to sufficient electromagnetic radiation in their responsive range to undergo this change.

Consequently, if all the particles in the system are sensitive to one wavelength of light or another and the system is exposed to an image with that wave length of light, a positive image will be formed on the surface of electrode 11 by the subtraction of bound particles from its surface leaving behind bound particles in unexposed areas. If all the polarities on the system are reversed, electrode 11 will preferably be capable of accepting injected holes from bound particles upon exposure to light and electrode 16 will be a blocking electrode incapable of injecting holes into the particles when they come into contact with the surface of this electrode.

Depending on the particular use to which the system is to be put, the suspension 14 may contain one, two, three or more different particles of various colors and having various ranges of spectural response. In a monochromatic system the particles included in the suspension 14 may be of any color and produce any color and the particular point or range or spectural response is relatively immaterial as long as it shows response in some region of the spectrum which can be matched by a convenient exposure source. In polychromatic systems, the particles may be selected so that particles of different colors respond to different wavelengths in the visible spectrum thus allowing for color separation. Regardless of whether the system is employed to produce monochromatic or polychromatic images it is desirable to use particles which are relatively small in size because smaller particles produce better and more stable dispersions in the suspension and are capable of forming images of higher resolution than would be possible with particles of larger size.

When the particles are suspended in the liquid carrier, they may take on a net electrostatic charge so that they may be attracted toward one of the two electrodes in the system depending on the polarity of its charge with respect to that of the electrodes. Some of the particles in the suspension may be positive, others negative and some even seem bipolar. The "wrong" polarity of particles of the suspensions may affect the overall image formed by subtracting some of the particles from the system before imagewise modulation of particle migration takes place or by leaving a higher image background. In other words, the above behavior causes a portion of the suspended particles to be removed from the system as potential image-formers while others stay behind leaving a more or less uniform residue.

Further, some particles which are charge injected during the imaging exposure acquire only a low positive charge. The electrical forces on them, however, are too small to overcome the bonding forces such as van der Waal's forces and the like. The forces generated by the electrical discontinuity causing an oscillation of the particles within the imaging area of the suspension will dislodge the wrongly held particles while the general influence of the electric field between the electrodes can act upon the particles to make them migrate according to the features of the electrophoretic imaging system.

By electrically agitating the system, particles of the "wrong" polarity can be removed from the suspension or at least substantially separated from the injecting electrode 11. This would provide better, quicker, more complete and intense imaging when the electrode 16 is passed over the suspension being subjected to actinic radiation in image configuration.

Let us consider a three color subtraction system where the suspension contains individual particles of a magenta, yellow and cyan color which are sensitive to green, blue and red wavelength radiation respectively. Under optimum conditions, consider that green light exposes the electroconductive glass processing the tri-mix (suspension with the three color particles mentioned above). The magenta particles absorb the light while the cyan and yellow particles reflect the light. The particles made conductive by absorbing the radiation exchange charge with the electroconductive glass as mentioned above. The magenta paritcles, as a result of their activation by exposure to the green light, become positive and migrate away from the injecting electrode. The cyan and yellow particles remain generally insulating and are not affected since they have little or no photosensitivity in the green light range of the spectrum. The magenta particles migrate selectively as made conductive to the negative blocking roller or electrode as the electrode traverses over the imaging surface. Thus a color reproduction of the original green light is obtained in image configuration on the injecting electrode by subtractive color. That is, the cyan and yellow pigments remaining appear green when viewed. This image then may be transferred using any suitable means known in the art such as that discussed in copending application Ser. No. 459,860 filed on May 28, 1965 in the name of V. Mihajlov et al and entitled, "Imaging Processes" and now abandoned.

The theory of operation of the imaging and the benefits derived from varying the potential applied at the suspension between the injecting electrode 11 and blocking electrode 16 is illustrated in FIG. 5. Here the small circles represent individual particles of pigment greatly exaggerated in size held in the suspension liquid 50. The large arrows 52 represent activating electromagnetic radiation which cause migration of the particles from the injecting electrode. The pluses and minuses indicated within the particles represent the charge of the particle in the suspension after action by the electromagnetic radiation. Some particles are randomly shown attached to each other or agglomerated. The wiggling lines, such as line 54, represent the motion of the particle through the suspension while the straight lines such as line 56 indicates the action of the varying electrical force on the particle or particle agglomerates. Generally the particles are not symmetrical in shape. They do tend to agglomerate, apparently without much regard for the intrinsic color of each particle.

There is a bias placed between the two electrodes such that positively charged particles would tend to migrate to electrode 16 where they will attach themselves, while negatively charged particles will tend to settle on electrode 11. When electromagnetic radiation such as that illustrated by the arrows 52 strike the particles on the injecting electrode 11, they tend to form hole-electron pairs releasing their electron to the injecting electrode 11 and migrating due to their positive charge to the negatively biased electrode 16. The oscillation and agitation caused by the imposed varying potential applied between the electrodes is thought to have two effects. One: it takes positively charged particles that are wrongly held near or at the injecting electrode 11 and shakes them loose. These particles are maintained on the injecting electrode due to bonding forces such as van der Waals'forces, capillary forces, and gravity, as well as possibly molecular and other small forces. By causing the particles to oscillate because of the varying potential force applied across them, the particles are pulled and bounced off the injecting electrode 11, thus dimishing the bonding forces which are dependent on the spacing between the particles and the electrode 11. Two: certain groups of particles which are agglomerated will be subjected to tensil forces due to the oscillation which can be made to be perpendicular to the imaging electrode 11. These tensil forces will tend to separate the agglomerated particles freeing the positive particles to migrate to electrode 16 and the negative particles to be attracted to the positive injecting electrode 11. When these negative particles reach the injecting electrode 11 they may be struck by electromagnetic radiation activating them. This causes them to become positive and to move to the blocking electrode 16 in the manner described above.

This second effect on the particles is only achievable during imaging if the oscillations are normal to the imaging electrode or the tangent thereto. This is so because the force necessary to break the agglomerates will smear and destroy the image if non-normal forces are present.

If the force levels are kept low enough so that the image will not be destroyed, oscillations can cause forces in any direction and still function to improve the image. The limitation on having a multi-directional oscillation of limited force is that agglomerates will not be separated.

The arrows shown within the electrode 16 and electrode 11 and designated 58 are merely representative of the electrical alternating forces applied to the suspension between the electrodes and affecting the particles between the electrodes.

FIG. 6 diagrammatically shows the electrical forces acting on the suspension of a system having a circuit similar to that of FIG. 1. The ordinate axis represents the potential applied across the suspension between the electrodes 16 and 11 while the abscissa axis represents time. The lowest dotted line on the graph is the constant voltage required or the Direct Current Ideal necessary to be maintained in order to cause particle migration in image configuration to form an acceptable image. The straight line parallel to the DCI line and designated DCA (Direct Current Actual) represents the actual constant potential that is being put out by a source such as source 17. The distance between the uppermost dotted line and lower most dotted line represents the maximum amplitude of the alternating potential and is called the ACA representing the Alternating Current Amplitude.

FIG. 7 represents graphically the electrical output from a circuit such as FIG. 3. The abscissa axis again represents time while the ordinate represents the potential across the suspension between two electrodes to which this circuit would be connected. The DCA and DCI are the same line, it being the solid line parallel to the abscissa. The ACA is that distance shown between the uppermost dotted and the solid line representing the actual and ideal constant potential designated DCA & DCI. There is a benefit with this rectified output to a system that requires a high potential in order to form an acceptable image since the potential variation caused by the varying potential is always in the same direction as the constant potential applied between the electrodes. This full recitifcation allows a minimum output from the constant potential source while still providing the necessary agitation from the varying potential to achieve the desired results of this invention.

FIG. 8 shows a partial view of an alternative apparatus for providing improved image quality in a photoelectrophoretic imaging system of the type generally described in the foregoing figures. Here an electrode such as 28 similar to that shown in FIG. 2 traverses an imaging electrode 11 after inking of the electrode and the formation of an image by the passage of another electrode over the injecting electrode 11. Of course, the apparatus described could function with the first imaging electrode and be within the scope of the invention. A potential source 60 is connected between the electrodes 11 and 28 to cause a field therebetween of sufficiently high potential as described herein to permit electrophoretic imaging while the field generated by the source 60 operates between the electrodes. An on-off switch 62 is provided in the circuit so that the source is made operable only when the electrode 28 is in use. A motor such as schematically shown and designated M-2 drives the electrode 28 to traverse the electrode 11. A control mechanism 64 permits the intermittent discontinuing field effect between the two electrodes by making and breaking the circuit between the source 60 and the two electrodes. Means 65 for varying the cycle, or the duty time within a fixed cycle, of the voltage applied between the two electrodes can be associated with the control mechanism 64.

Wave forms that are generated by this apparatus are shown in FIG. 9 and FIG. 10. FIG. 9 shows a square wave having an on and off time of 50 percent each during a full cycle. The cycle is shown between the space marked 66. The duty time, when the field exists between the two electrodes, is that portion of the cycle indicated by the numeral 68. FIG. 10 is a pulsed input having squared rise and fall field. It has a cycle time designated by the numeral 70 with a duty time during which an actual field is applied across the gap between the electrodes 28 and 11 designated by the numeral 72. The duty time 72 can be any portion of the total cycle even as low as 1 percent or less of the time involved in a single cycle.

A continuous appearing image will be formed by the apparatus shown in FIG. 8 as with the apparatus shown in the other figures when the frequency of the cycle corresponds to the formula given hereinafter. The limitation on the pulsed wave cycle duty time is that it be of a long enough duration so that the particles located between the electrodes 28 and 11 have sufficient time to image according to the image configuration determined by the light source striking the portions of the electrode 11. As long as the amplitude of the voltage and the duration of the duty time are over the thresholds required to cause photoelectrophoretic migration of the particular particles used in the ink, the system will function to affect the suspension and therefore the image as described herein.

When using the methods and apparatus shown above on a photoelectrophoretic imaging system, the photographic speed and color saturation of a polychromatic system or the photographic speed alone of a monochromatic system is improved. In order to achieve these results without a noticeable striation affect, the frequency of the varying potential should be determined according to the following formula:

$$f \geq V_c R$$

Where:
$f$ = the varying potential frequency in Hertz
$V_c$ = the relative velocity between the electrodes in millimeters per second and
$R$ = resolution desired in line-pairs per millimeter.

The amplitude of the frequency used will depend on the response of the pigment particles to the potential change at a selected frequency, and should be less than that which will cause air breakdown at the nip between the imaging electrodes.

The imaging of the suspension particles occurs only at the image zone between the two electrodes being struck by light and having a field therebetween. By causing a discontinuing field we actually cause particle migrations to occur several times within one contact zone between the two electrodes. As shown in the above embodiments, one electrode traverses another at a particular velocity, $V_c$. This velocity is generally slow compared to the frequency of the discontinuing field application. Therefore, within any given imaging zone several cycles of frequency variations will occur. It is the spacing between the edges of these cycle bands on the image that is referred to as the resolution of the image formed. Naturally, for a faster relative movement between the electrodes and a fixed given frequency of discontinuing fields the resolution of the image will decrease. Likewise, for a reduction in the frequency of discontinuance of the field and a constant relative velocity between the electrodes, the image resolution will decrease. By the same formula, of course, the inverse will cause a higher resolution of the image.

If a visible half-tone screen image is desired, this can be readily achieved by making the frequency f slightly less than VcR. This will cause a striation effected image which could be controlled to render a useable half-tone line within it.

It is thought that the increased photographic speed of the system is a result of faster particle migration. The particle migration rate is increased because of a decrease in physical resistane between the adjacent particles of the suspension. The physical resistance to movement is decreased because of the oscillation of individual particles caused by the electrical forces exerted on the particle.

While this invention has been described with reference to the structures disclosed herein and while certain theories have been expressed to explain the experimentally obtainable results obtained, it is not confined to the details set forth; and this application is intended to cover such modifications or changes as may come within the purposes of the improvements or the scope of the following claims.

What is claimed is:

1. A method for imaging electrophoretic suspensions comprising electrically photosensitive particles including the steps of
    providing a first electrode adapted to support an image formed from the suspension,
    contacting the suspension with at least another electrode such that the suspension is maintained between said first electrode and said other electrodes,
    exposing the suspension to an image with activating electromagnetic radiation, and
    periodically applying an electric field across the suspension between the first electrode and the other electrodes.

2. The method of claim 1 wherein the steps of exposing and periodic applying of an electric field occur simultaneously and the frequency of the periodic application of the field is at a rate such that the field is applied when the electrodes are in contact with the suspension at contiguous portions thereof.

3. The method of claim 1 wherein application of the field is such that the period is cyclic and the wave form approximates a square wave.

4. The method of claim 1 wherein the application of the field is such that the period is cyclic and the wave form thereof is at least a portion of a sine wave.

5. The method of claim 3 or 4 wherein the duty time of the cycle is 50 percent of the cycle time.

6. The method of claim 3 or 4 wherein the duty time of the cycle is less than 50 percent of the cycle time.

7. The method of claim 3 or 4 wherein the duty time of the cycle is greater than 50 percent of the cycle.

8. In a method for imaging electrophoretic particle suspensions having a first electrode adapted to support an image formed from the suspension, at least another electrode for contacting the suspension such that it is maintained between said electrodes, including applying an electric field across the suspension between the first and the other electrodes, and exposing the suspension to an image with activating electromagnetic radiation the improvement including periodically varying the electric field across the suspension, said variation being of such a direction and amplitude as to remain above the threshold potential for forming an image electrophoretically.

9. The method of claim 8 wherein said periodic varying of potential is of a constant frequency.

10. The method of claim 8 wherein said periodic varying potential has a constant peak amplitude.

11. The method of claim 8 wherein said periodic varying potential includes a positive and negative amplitude.

12. The method of claim 8 wherein said periodic varying potential includes a rectified amplitude having a potential substantially only in a direction additive to the applied electric field.

13. The method of claim 8 wherein the frequency of the periodic varied field is capable of itself being varied.

14. The method of claim 9 wherein the frequency is such that its effect on the image is greater than five line pairs per millimeter.

15. The method of claim 1 including causing relative movement at a predetermined velocity between the first electrode and the other electrode.

* * * * *